US 10,173,685 B2

(12) United States Patent
Schaper et al.

(10) Patent No.: US 10,173,685 B2
(45) Date of Patent: Jan. 8, 2019

(54) CONTROL SYSTEM AND METHOD FOR DETERMINING A LANE OF A FOLLOWING VEHICLE

(71) Applicant: TRW AUTOMOTIVE GMBH, Alfdorf (DE)

(72) Inventors: Monika Schaper, Cologne (DE); Hrachia Grigorians, Kaarst (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 15/402,506

(22) Filed: Jan. 10, 2017

(65) Prior Publication Data

US 2017/0197627 A1 Jul. 13, 2017

(30) Foreign Application Priority Data

Jan. 11, 2016 (DE) .................. 10 2016 000 185

(51) Int. Cl.
*G05D 1/00* (2006.01)
*G06K 9/00* (2006.01)
*G08G 1/16* (2006.01)
*B60W 30/18* (2012.01)
*B60W 40/04* (2006.01)

(52) U.S. Cl.
CPC ...... *B60W 30/18163* (2013.01); *B60W 40/04* (2013.01); *G05D 1/0088* (2013.01); *G06K 9/00791* (2013.01); *G08G 1/167* (2013.01); *B60W 2550/20* (2013.01)

(58) Field of Classification Search
CPC .......... B60W 30/18163; B60W 40/04; B60W 2550/20; G05D 1/0088; G06K 9/00
See application file for complete search history.

(56) References Cited

U.S. PATENT DOCUMENTS

| 6,388,565 | B1 | 5/2002 | Bernhard et al. | |
|---|---|---|---|---|
| 2003/0025597 | A1* | 2/2003 | Schofield | B60Q 1/346 340/435 |
| 2010/0253598 | A1* | 10/2010 | Szczerba | G01S 13/723 345/7 |
| 2015/0194055 | A1 | 7/2015 | Maass | |
| 2016/0059858 | A1 | 3/2016 | Heinrich et al. | |
| 2018/0025645 | A1* | 1/2018 | Schwindt | G08G 1/167 |

* cited by examiner

*Primary Examiner* — Aaron L Troost
(74) *Attorney, Agent, or Firm* — Tarolli, Sundheim, Covell & Tummino LLP

(57) ABSTRACT

A Control system, which is adapted for application in a vehicle and intended to detect following vehicles on the basis of environmental data which are obtained from one or several environmental sensors disposed on the vehicle and which reflect the area in front of, laterally next to, and/or behind the vehicle. The control system is adapted to detect a course of the own lane of the vehicle and to store it over a predefined road section, and to detect one or several other vehicles participating in traffic behind the own vehicle with the environmental sensors. A lane associated with each other vehicle, in which the other vehicle(s) drive(s), is detected, taking the stored course of the own lane into account. An occupancy of the own lane and/or of at least one adjacent lane by the other vehicle(s) is determined.

4 Claims, 1 Drawing Sheet

CONTROL SYSTEM AND METHOD FOR DETERMINING A LANE OF A FOLLOWING VEHICLE

BACKGROUND TO INVENTION

A control system and a method for determining s lane of a following vehicle are disclosed here. This system and method are based in particular on an environmental sensor system in vehicles and support the driver in performing safe lane changes of a vehicle, for example for overtaking manoeuvres of the vehicle. In autonomously controlled vehicles, it increases the safety of the occupants of the vehicle.

PRIOR ART

Current driver assistance systems (ADAS—advanced driver assistance system) offer a plurality of monitoring and hint functions in vehicles, in order to make the driving of a vehicle safer. In this regard the environment of the vehicle is monitored on the basis of environmental data obtained from one or several environmental sensors disposed on the vehicle with respect to the journey progress of the own vehicle.

Known driver assistance systems monitor, for example, whether the vehicle is located within a lane and whether the driver drifts unintentionally to one side of the lane or is on the point of leaving it. Even so-called "blind spot monitors" belong to current driver assistance systems. These determine, for example by means of radar, lidar, video or the like, whether another vehicle, road user or object is located to the side of and/or behind the vehicle, so that a collision could occur when changing lanes or turning off.

In vehicles driven by persons, these systems mostly offer a hint function, to warn the driver of a critical situation or a corresponding manoeuvre. The driver assistance systems can likewise be applied even in autonomously controlled vehicles, in order to provide the autonomous controller with the corresponding environmental data,

Underlying Problem

On roads with several lanes in one driving direction, a lane change from a "slower" lane to a lane with faster vehicles can have fatal consequences if the traffic behind is not judged correctly or is not recognised correctly. A lane change from the "slower" lane, for example to an overtaking lane (thus from the right to the left lane e.g. in continental Europe or the USA), often means that another vehicle ahead of the own vehicle must be observed and at the same time the speed of the following traffic in the overtaking lane must be estimated. In Germany in particular, high speed differences can exist between the vehicle ahead (and the own vehicle) and a following vehicle in the overtaking lane. A speed difference of 100 km/h is not uncommon here.

Even in the case of small speed differences, the traffic behind can be judged incorrectly. If a road with multiple lanes has a curved progression, it is not always immediately recognisable for a driver which lane another vehicle behind is in. This problem occurs especially frequently at night in particular. Even driver assistance systems have problems here, as although they "see" another vehicle, they do not necessarily recognise which lane this other vehicle is travelling in.

Proposed Solution

A control system which is adapted and intended for application in a vehicle or motor vehicle detects following vehicles on the basis of environmental data obtained from one or several environmental sensors disposed on the vehicle. To this end the environmental sensors are adapted to provide an electronic controller (ECU) of the control system with the environmental data reflecting the area in front of, laterally next to and/or behind the vehicle. The control system is adapted and intended at least to detect a course of the own lane of the own vehicle with the environmental sensors and to store it over a predefined road section. The control system is further adapted and intended at least to detect one or several other vehicles participating in the traffic behind the own vehicle with the environmental sensors. The control system is adapted and intended at least to detect a lane associated with any other vehicle, in which the other vehicle(s) is/are driving, taking the stored course of the own lane into account. The control system is adapted and intended at least to determine an occupancy of the own lane and/or the lane lying adjacent by the other vehicle(s), taking the stored course of the own lane into account. Based on the occupancy determined, the control system is adapted and intended at least to (i) output a corresponding indication about the occupancy of the own lane and/or the at least one adjacent lane, (ii) to output an indication about a safe or unsafe lane change to a specific of the at least one adjacent lane and/or (iii) to perform an autonomous lane change to the specific of the at least one adjacent lane by the own vehicle (ego) if the occupancy determined permits a safe lane change.

In conventional environmental and assistance systems, only other vehicles that are located in an area behind the own vehicle are detected. If applicable, a speed between another vehicle and the own vehicle is additionally determined. Based on the position of the other vehicle and/or the speed difference between the other vehicle end the own vehicle, indications are output, which inform the driver of the own vehicle about the presence of the other vehicle or an approach of the other vehicle to the own vehicle. Specific information on whether the other vehicle is located in a specific lane, or a lane change of the own vehicle can lead to a dangerous situation with the other vehicle, is not offered to the driver of the own vehicle in conventional systems.

The solution presented hero is suitable in particular for situations in which the driver of the own vehicle wishes to perform a lane change. If he should judge the following traffic incorrectly or fail to see another vehicle by looking in the rear view mirror(s), he is better informed and/or warned of a dangerous situation by the present control system. Even in autonomously controlled vehicles, autonomously performed lane changes, such as overtaking manoeuvres, become safer for the occupants.

Other Adaptations and Advantageous Developments

The control system can be adapted and intended to detect the other vehicles) during a predetermined period of time or continuously and to detect the lane associated with the other vehicle(s). The control system can then determine the lane occupancy and detect the driving situation of the own vehicle and the other vehicle(s) over the time and evaluate it in regard to a safe operation, with the aim of determining the point in time after which the safe lane change is possible.

The detection of one or several other vehicles during a predetermined period of time permits a trend in the traffic situation to be determined. For example, the control system can be adapted and intended to monitor the lane occupancy with a view to whether the occupancy of one or several lanes increases or decreases. With reference to this trend (this development) the control system can determine a (possibly also future) point in time, after which the lane(s) very probably has/have a preferred occupancy for a lane change or overtaking manoeuvre.

The control system can further be adapted and intended to detect the course of the own lane with reference to environmental data for an area lying in front of, laterally in front of and/or laterally next to the vehicle. Due to the environmental data thus obtained, it is possible for the control system to detect and store the course of a road over a predetermined road section. The lanes of a road or a carriageway usually lie parallel to one another. The course detected for the lane of the own vehicle can thus be transferred to all lanes of the road or the carriageway.

Put more precisely, the control system is adapted and intended to detect the course of the own lane as a trajectory of the lane progression and to store it. This trajectory can be matched by the control system with the position of other vehicles behind the own vehicle obtained by the environmental sensors, for example as a function of an orientation of the own vehicle or position of the own vehicle in a global coordinates system. The occupancy thus obtained of one or several lanes can be used to output an indication about the occupancy of the lane(s), to output an indication on a safe or unsafe lane change and/or to perform an autonomous lane change.

Another aspect of the proposed solution relates to a control method, which in a vehicle recognises following vehicles based on environmental data obtained from one or several environmental sensors disposed on the vehicle. The method has the following steps:

to detect a course of the own lane of the own vehicle with the environmental sensors and to store it over a predefined road section, to provide an electronic controller in the own vehicle by means of the environmental sensors with environmental data reflecting the area in front of, laterally next to and/or behind the vehicle, to detect one or several other vehicles participating in traffic behind the own vehicle with the environmental sensors, taking the stored course of the own lane into account, to detect a lane associated with each other vehicle, in which the other vehicle(s) drive(s), taking the stored course of the own lane into account, to determine an occupancy of the own lane and/or of at least one adjacent lane by the other vehicle(s), and on the basis of the determined occupancy (i) to output a corresponding indication about the occupancy of the own lane and/or of the at least one adjacent lane, (ii) to output an indication on a safe or unsafe lane change to a specific of the at least one adjacent lane and/or (iii) to perform an autonomous lane change to the specific of the at least one adjacent lane by the own vehicle if the determined occupancy permits a safe change of lane.

BRIEF DESCRIPTION OF THE DRAWING

Other elms, features, advantages and application options result from the following description of practical examples, which should not be understood as restrictive, with reference to the related drawings. Here all described and/or illustrated features show the object disclosed here by themselves or in any combination, even independently of their grouping in the claims or their references. The dimensions and proportions of the components shown in the figures are not necessarily to scale in this case; they can deviate from what is shown here in embodiments to be implemented.

DETAILED DESCRIPTION OF THE DRAWINGS

Figure 1A:
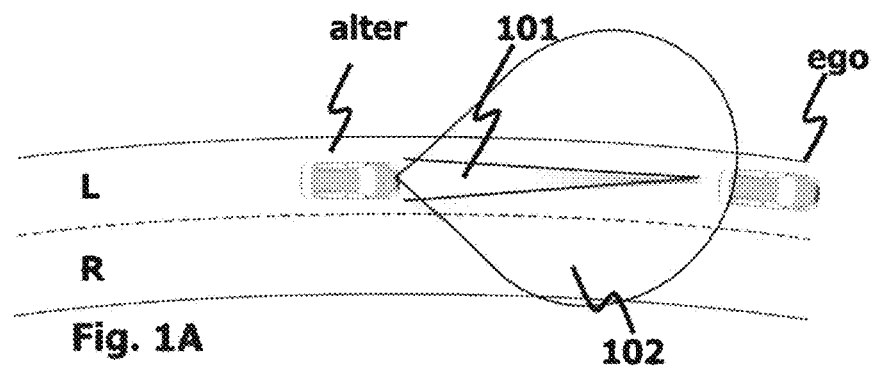
FIGS. 1A and 1B show schematically a first and a second driving situation, in which the own vehicle drives in the left-hand lane and monitors the traffic behind using known systems, wherein the occupancy of the lanes by another vehicle is rated correctly or incorrectly.

FIG. 1A shows schematically a first driving situation. In which an own vehicle ego drives in a left-hand lane L of a multiple-lane, here two-lane, road. Another vehicle alter is located in the same lane L. In the case described here, a normal usage of the lanes (for continental Europe and the USA, for example) and normal speed distribution of the vehicles in the respective lanes is assumed.

The own vehicle ego has a control system according to the present disclosure with an electronic controller ECU (Electronic Control Unit). For example, by means of the ECU the present control system can at least be adapted and intended to detect one or several other vehicles alter participating in traffic behind the own vehicle ego using environmental sensors. For example, the ECU receives signals from environmental sensors, processes these signals and associated environmental data and produces control and/or output signals.

In the first driving situation shown in FIG. 1A, an environmental sensor (not shown) of the own vehicle ego transmits a signal 101 to an area behind the own vehicle ego, where it is reflected by the other vehicle alter behind. At least one environmental sensor of the own vehicle ego can detect this reflected signal 102 and thus recognise the other vehicle alter. In this case parameters of the other vehicle alter, such as, for example, distance, speed, etc., can be calculated by continuous measurement. This permits the recognition of a possible collision if the other vehicle alter should he faster than the own vehicle ego. This information can inform the driver of the own vehicle ego of the possible collision through a corresponding assistance system. In an autonomously driving vehicle, the information about the possible collision can trigger an automatic lane change from the common left-hand lane L to the right-hand lane R. Conversely, an intended lane change by an autonomous system to the lane L of the faster vehicle alter can naturally be prevented or aborted if a possible collision should prove likely.

Figure 1B:
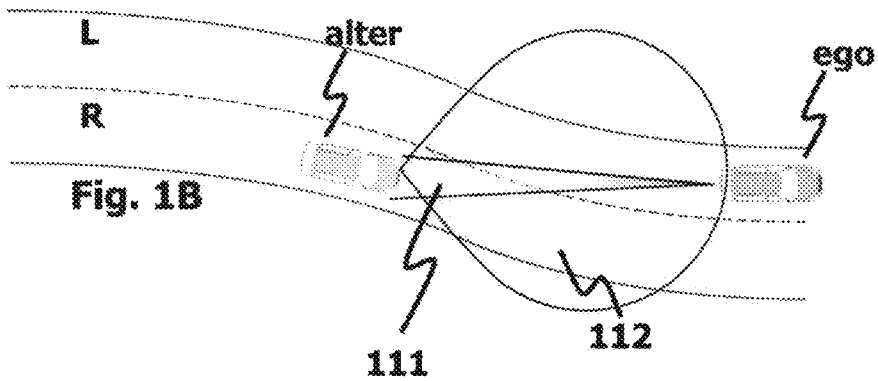

In FIG. 1B, a second driving situation is shown in which the own vehicle ego emits a signal 111 by an environmental sensor to the rear in the same manner and receives a reflected signal 112 from another vehicle alter. As can be recognised from a comparison of the two FIGS. 1A and 1B, the front vehicle ego calculates the same parameters (distance, speed, possible collision etc.) for the other vehicle alter. However, the difference is that in FIG. 1B the other vehicle alter is located in the right-hand lane R thus in a different lane from the own vehicle ego. Due to the different road progression of the first and second driving situation, a following vehicle alter is recognised in both cases. However, the association of a lane with the other vehicle alter can be determined incorrectly or not take place at all. In such a case, driver assistance systems or systems for autonomous driving make wrong decisions that place the own vehicle ego in a dangerous situation.

In FIGS. 1A and 1B, narrow, wedge-shaped areas 101, 111 are shown behind the own vehicle ego, which represent monitoring areas of radar sensors that are not explained in further detail. The reflected signals 102, 112 are shown as spherical or pear-shaped, as the reflection has a certain beam effect. These areas are naturally only schematic representations of the areas to clarify the present disclosure.

The radar sensors supply the electronic controller ECU with radar signals about the distance of the other vehicles alter_1 to alter_n. From these, the ECU can calculate over a specific monitoring period a difference in speed between the own vehicle ego and the respective other vehicle slier, a travel direction of the other vehicle and if applicable also an angle of rotation of the other vehicle alter about its vertical axis. This information can also be calculated alternatively by the radar sensor and transmitted directly to the ECU.

The environmental sensors continuously detect one or several other vehicles alter participating in the traffic in front of, laterally next to and/or behind the own vehicle ego, in order to determine parameters about the driving situations) of the other vehicle(s). These parameters include, for example, the speed, location as a function of time, driving direction of the other vehicle(s).

The control system described here and adapted and intended for use in a vehicle has other environmental sensors as well as or instead of the radar sensor(s), which environmental sensors serve to detect the surroundings of the own vehicle ego and operate using a different technology, such as video, ultrasound, lidar, etc., for example. The electronic controller ECU processes the environmental data obtained from the environmental sensor(s) (radar sensor(s)) disposed on the vehicle to determine whether another vehicle alter is moving relative to the own vehicle ego in a—same or adjacent—lane and what speed or difference in speed in relation to the own vehicle this other vehicle has. To this end the environmental sensors provide the electronic controller ECU with environmental data reflecting the area in front of, laterally next to and/or behind the vehicle.

The present control system now offers a possibility of preventing the incorrect association described above of another vehicle alter with a lane and wrong decisions resulting from this. This is explained with reference to FIGS. 2A and 2B, which likewise show the first and second driving situation schematically as they are shown also in FIGS. 1A and 1B.

To this end the control system is adapted and intended to detect a course of the own lane of the own vehicle ego with the environmental sensor(s) and to store it over a predefined road section. The control system can be adapted and intended to detect the course of the own lane L with reference to environmental data for an area lying in front of, laterally in front of and/or laterally next to the vehicle. For example, signals 201 of at least one environmental sensor (not shown) directed forwards are evaluated to set the limit 210 of the own lane L. Corresponding environmental sensors can also be used in so-called lane assistance systems, which draw a driver's attention to the fact that he is leaving the own lane or has a tendency to this.

In particular, the control system or the electronic controller ECU is adapted and intended to detect a lane associated with any other vehicle alter, in which the other vehicle(s) alter is/are driving. The present control system can take the stored course of the own lane L into account here.

Furthermore, the control system or the controller ECU can determine an occupancy of the own lane L, R and/or at least one adjacent lane by the other vehicle(s) alter. For this the control system can likewise take the stored course of the own lane L into account.

If the occupancy of the own lane and/or of at least one adjacent lane by other vehicles has been determined, the control system or the controller ECU can, based on the occupancy determined, (i) output a corresponding indication about the occupancy of the own lane and/or the at least one adjacent lane, (ii) output an indication on a safe or unsafe lane change to a specific of the at least one adjacent lane and/or (iii) perform an autonomous lane change to the specific of the at least one adjacent lane by the own vehicle ego if the determined occupancy permits a safe lane change.

An indication about the occupancy of the own lane and/or of another lane as well as the indication on a safe/unsafe lane change can be displayed to the driver of the own vehicle ego in a display in the dashboard, for example, in a rear-view mirror (inside as well as external mirror) and/or by means of a projection onto the rear windscreen and/or the front windscreen of the vehicle by suitable symbols. Alternatively or in addition, the indication can also be output acoustically or haptically.

The control system is further adapted and intended to detect the other vehicle(s) alter during a predetermined time period or continuously, to detect the lane associated with the other vehicle(s) alter and to determine the lane occupancy. In this case the driving situation of the own vehicle ego and of the other vehicle(s) alter can be detected over the time and evaluated in regard to a safe operation, with the aim of determining the point in time after which a safe lane change is possible. The predetermined time period can be set as a function of the speed of the own vehicle ego. For example, a larger time period can be selected as the speed of the own vehicle ego increases, in order to better avoid risky situations due to the higher speed.

The control system can further be adapted and intended to detect and store the course 210 of the own lane L as trajectory 220. To do this, the position of the own lane L is determined, for example, with reference to environmental data, which represent one or several demarcation line(s) 210 applied to the read surface.

The environmental data can be pictures 201 taken by a camera, for example, which show the one or several demarcation line(s) 210. On account of differences in brightness relative to the road surface and a linear progression that can be established over the distance and/or time, the position of the one or several demarcation line(s) 210 in regard to the own vehicle ego can be detected and stored. The data that reflect the position of the one or several demarcation line(s) 210 can be stored over a certain period. This storage, for a predetermined time window, permits the detection of a trajectory 220 of the progression of the own lane L. The predetermined time window or the duration of the storage can be a set value, but can also be set as a function of the speed of the own vehicle ego. Alternatively or in addition, the time window or the length of the stored trajectory 220 can also be a function of a magnitude of the memory for the trajectory 220.

The position of the own lane L can be determined additionally or alternatively to the linear progression of the lane L (for example the demarcation line(s) 210) determined from the environmental data also on the basis of a travel progression of the own vehicle (c)go detected by other vehicle sensors (not shown). To this end the steering movement, signals of an acceleration sensor, data of an electronic stability program (ESP) etc. can be used, for example. By this a position of the lane demarcation 210 determined by environmental data can be related to the position of the own vehicle ego, due to which the determination of the trajectory 220 is improved.

In addition, the detection of the respective lane can take place with reference to a lateral distance from the longitudinal axis of the own vehicle ego. The controller ECU can determine this lateral distance by means of a single environmental sensor, for example, which detects the area 101 behind the own vehicle ego. As shown in FIG. 1, a single environmental sensor can monitor a narrow area 101 directly behind the vehicle and output corresponding signals about another vehicle alter located therein. Vehicles that are located completely in this narrow area 101 can be identified as vehicles that are located in the same lane L as the own vehicle ego.

Alternatively or in addition, the controller ECU can determine the lateral distance also using a single environmental sensor, which monitors an area (not shown) laterally behind the own vehicle ego. If this is the environmental sensor that monitors an area located to the left side behind the own vehicle ego, a left-hand lane can be detected as the lane associated with another vehicle alter. By determining the lateral distance from the own vehicle ego, a lane associated with another vehicle alter can be identified even in the case of several adjacent lanes. To this end a threshold value depending on a predetermined lane width can also be used to detect the respective lane of another vehicle alter in a comparison of the lateral distance with the threshold value.

Likewise alternatively or in addition, the controller ECU can determine the lateral distance of another vehicle alter from the own vehicle ego also using several environmental sensors, for example by means of one or several sensors for a rear area 101 and one or several sensors for at least one lateral area of the own vehicle ego. By detecting another vehicle alter using several sensors, both the position and the associated lane of this other vehicle alter can be detected.

Figure 2A:
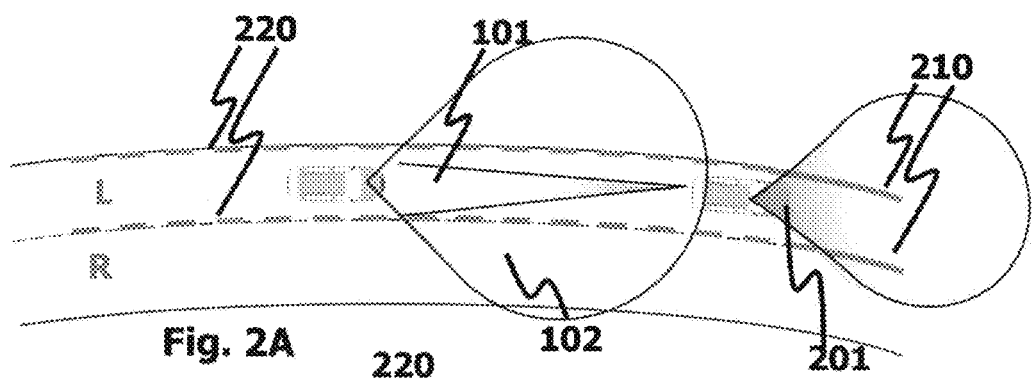
FIGS. 2A and 2B show schematically the first and second driving situation from FIGS. 1A and 1B, wherein the own vehicle correctly rates the occupancy of the left-hand lane by another vehicle using a system according to the present disclosure in both cases.

The first driving situation shown in FIG. 2A can be detected more accurately compared with the system shown in FIG. 1A. The parameters of the other vehicle alter detected by the signal 102 can be matched together with the stored trajectory 220, so that an occupancy of the lane, here the own lane L of the own vehicle ego, is safely determined.

Figure 2B:
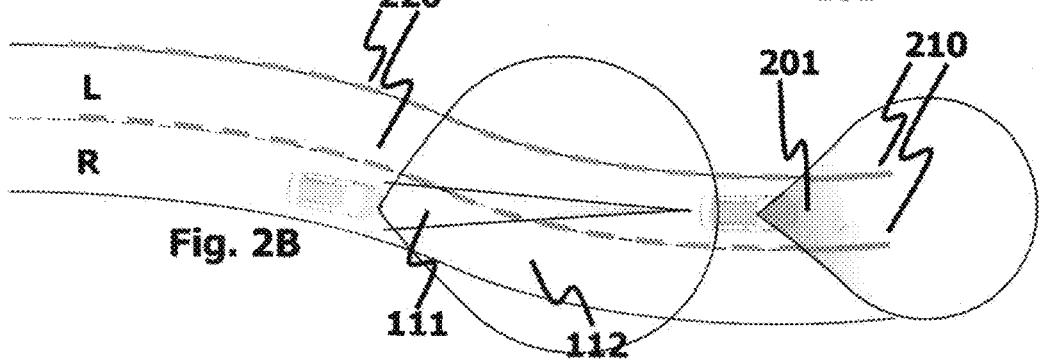

With regard to the second driving situation shown in FIG. 2B, the advantage of the present control system is even clearer. The occupancy of the own lane i and/or of an adjacent lane R is determined much more accurately, as the other vehicle alter detected by environmental data of one or several rear sensors (signals 111 and 112) is determined almost unambiguously as driving in or next to the own lane L by means of the stored trajectory 220.

After the associated lane has been determined for one, some or each further other vehicle alter participating in the traffic, the occupancy of each lane can be determined. The occupancy of a lane can mean in the simplest case that one or several vehicle(s) are or are not located in this lane. The occupancy of the lane(s) can be determined additionally or alternatively in the form of a degree of occupancy. The degree of occupancy can concern all lanes generally or refer only to a certain lane. For example, the degree of occupancy can indicate how many of all lanes are occupied by other vehicles alter, for example, two lanes out of three.

Alternatively or in addition, the degree of occupancy can be calculated only for a certain lane or each individual lane. To this end a maximum occupancy of a lane is assumed and a corresponding percentage calculated with reference to the vehicles detected in this lane. A maximum occupancy of a lane can foe predetermined, for example, as a function of the speed of the own vehicle ego. In a traffic jam (speed v=0 km/h or v≤5 km/h) more vehicles can be located in a lane than in normal driving (speed v≥30, 50, 85, 130 . . . km/h).

In addition, the controller ECU can be adapted and intended to recognise even empty lanes, thus to determine that no other vehicle is located in a certain lane. This can be calculated, for example, with reference to distances of other vehicles alter from one another and/or from the own vehicle ego. Even distances between objects in and/or next to the lanes and other vehicles alter and/or the own vehicle ego can be evaluated to detect all lanes. In this case a predetermined threshold value, which corresponds to a width of a lane, can be used when determining the position of the individual lanes.

Conventional systems determine only a difference in speed from other vehicles alter to warn the driver of the own vehicle ego of such an approaching vehicle. To this end at least one other vehicle alter must be detected by at least one environmental sensor and "observed" over a certain period of time. Otherwise the difference in speed can only be determined vary imprecisely. Due to this, however, other vehicles alter are only rated as a risk very late on.

The present control system, on the other hand, offers the advantage of determining the lane of a certain vehicle very precisely. Thus warning can be given of collisions with vehicles, in particular vehicles with a high difference in speed from the own vehicle ego. Likewise, the present control system can be used in an autonomously driving vehicle to be able safely to perform an autonomous lane change, such as in an autonomous overtaking manoeuvre, for example.

The variants described above and their construction and operating aspects serve only for a better understanding of the structure, mode of operation and attributes; they do not restrict the disclosure to the practical examples, for instance. The figures are partly schematic, wherein substantial attributes and effects are shown in some cases considerably enlarged, in order to clarify the functions, active principles, technical adaptations and features. Each mode of operation, each principle, each technical adaptation and each feature here, which is/are disclosed in the figures or in the text, can be combined freely and in any way with all claims, each feature in the text and in the other figures, other modes of operation, principles, technical adaptations and features that are contained in this disclosure or result from it, so that ail conceivable combinations are to be associated with the variants described. Even combinations between all individual implementations in the text, meaning in each section of the description, in the claims and also combinations between different variants in the text, in the claims and in the figures are also comprised. Even the claims do not limit the disclosure and thus the combination possibilities of all features shown with one another. All disclosed features are disclosed here explicitly also individually and in combination with all other features.

The invention claimed is:

1. A vehicle control system for detecting following vehicles on the basis of environmental data, the vehicle control system comprising:
   an electronic controller; and
   one or several environmental sensors disposed on the vehicle, the environmental sensors being adapted to provide the electronic controller with the environmental data which reflect the area in front of, laterally next to and/or behind the vehicle, wherein the electronic controller is adapted to:
  detect a course (210) of the own lane (L) of the own vehicle (ego) with reference to environmental data provided by the environmental sensors, the environmental data representing one or several demarcation lines of the own lane applied to a surface of a road for an area lying in front of, laterally in front of, and/or laterally next to the vehicle,
  store data reflecting a position of the one or several demarcation lines over a predefined road section as a trajectory (220) of the lane progression,
  transfer the course of the own lane to all other lanes of the road,
  detect one or several other vehicles (alter) participating in traffic behind the own vehicle (ego) by means of the environmental sensors,
  detect a lane (L, R) associated with each other vehicle in which the other vehicle(s) (alter) drive(s), taking the stored trajectory (220) of the lane progression of the own lane (L) and the transferred course of the other lanes into account,
  determine an occupancy of the own lane (L) and/or of at least one adjacent lane (R) by the other vehicle(s) (alter), taking the stored course (210) of the own lane (L) into account, and
  on the basis of the determined occupancy: (i) to output a corresponding indication about the occupancy of the own lane (L) and/or of the at least one adjacent lane (R), (ii) to output an indication on a safe or unsafe lane change to a specific of the at least one adjacent lane (R) and/or (iii) to perform an autonomous lane change to the specific of the at least one adjacent lane (R) by the own vehicle (ego) if the determined occupancy allows a safe change of lane.

2. The control system according to claim 1, which is adapted to detect the other vehicle(s) (alter) during a predetermined period of time or continuously, to detect the lane (R) associated with the other vehicle(s) (alter) and to determine the lane occupancy and to detect the driving situation of the own vehicle (ego) and of the other vehicle(s) (alter) over the time and evaluate them in regard to a safe operation with the aim of determining the point in time after which the safe lane change is possible.

3. A control method, which in a vehicle is for detecting following vehicles based on environmental data obtained from one or several environmental sensor(s) disposed on the vehicle, with the steps of:
  providing an electronic controller in the own vehicle (ego) by means of the environmental sensors with environmental data reflecting the area in front of, laterally in front of and/or laterally next to and/or behind the vehicle,
  detecting a course (210) of the own lane (L) of the own vehicle (ego) with reference to environmental data provided by the environmental sensors, the environmental data representing one or several demarcation lines of the own lane applied to a surface of a road for the area lying in front of, laterally in front of, and/or laterally next to the vehicle,
  storing data reflecting a position of the one or several demarcation lines over a predefined road section as a trajectory (220) of the lane progression,
  transferring the course of the own lane to all other lanes of the road,
  detecting one or several other vehicles (alter) participating in traffic behind the own vehicle (ego) with the environmental sensors,
  detecting a lane (L, R) associated with each other vehicle (alter), in which the other vehicle(s) (alter) drive(s), taking the stored trajectory (220) of the lane progression of the own lane (L) and the transferred course of the other lanes into account,
  determining an occupancy of the own lane (L) and/or of at least one adjacent lane (R) by the other vehicle(s) (alter), taking the stored trajectory (220) of the lane progression of the own lane (L) and the transferred course of the other lanes into account, and
  on the basis of the determined occupancy (i) outputting a corresponding indication about the occupancy of the own lane (L) and/or of the at least one adjacent lane (R), (ii) outputting an indication on a safe or unsafe lane change to a specific of the at least one adjacent lane (R) and/or (iii) performing an autonomous lane change to the specific of the at least one adjacent lane (R) by the own vehicle (ego) if the determined occupancy permits a safe change of lane.

4. The control method according to claim 3, wherein detection of the other vehicle(s) (alter), the detection of the lane (R) associated with each other vehicle (alter) and the determination of the lane occupancy take place during a predetermined period of time or continuously, with the step of:
  detecting the driving situation of the own vehicle (ego) and of the other vehicle(s) (alter) over the time and evaluate them in regard to its safe operation, with the aim of determining the point in time after which the safe lane change is possible.

\* \* \* \* \*